United States Patent [19]

Capuano

[11] 4,033,394

[45] July 5, 1977

[54] CLAMPING SPLIT LOCK NUT

[75] Inventor: Terry D. Capuano, Newington, Conn.

[73] Assignee: Veeder Industries, Inc., Hartford, Conn.

[22] Filed: June 23, 1975

[21] Appl. No.: 589,011

[52] U.S. Cl. .............................. 151/21 C; 85/32 V
[51] Int. Cl.² ........................................ F16B 39/02
[58] Field of Search .................. 151/14 R, 21 C; 85/32 V; 403/344; 24/277

[56] References Cited

UNITED STATES PATENTS

| 159,491 | 2/1875 | Barrowclough | 151/14 R |
| 439,660 | 11/1890 | Holmquist | 151/21 C X |
| 466,582 | 1/1892 | Smith | 151/21 C |
| 896,465 | 8/1908 | Rosen | 151/21 C |
| 1,097,218 | 5/1914 | Gast et al. | 151/21 C |
| 1,350,142 | 8/1920 | Dickinson | 151/21 C |
| 1,433,528 | 10/1922 | Bryant et al. | 151/21 C X |
| 3,868,193 | 2/1975 | Schott | 403/344 |

FOREIGN PATENTS OR APPLICATIONS

| 681,174 | 1/1965 | Italy | 403/344 |

Primary Examiner—Roy D. Frazier
Assistant Examiner—Thomas J. Holko
Attorney, Agent, or Firm—Ernest M. Junkins

[57] ABSTRACT

A threaded nut having a through radial slot bridged by a screw and a diametrically opposite partial radial slot that leaves a cross-sectional area of the nut which provides a tensile strength that is related to the ability of the screw to close the through slot whereby the nut, when clamped onto a shaft, is essentially evenly compressed about its contact area with the shaft.

5 Claims, 3 Drawing Figures

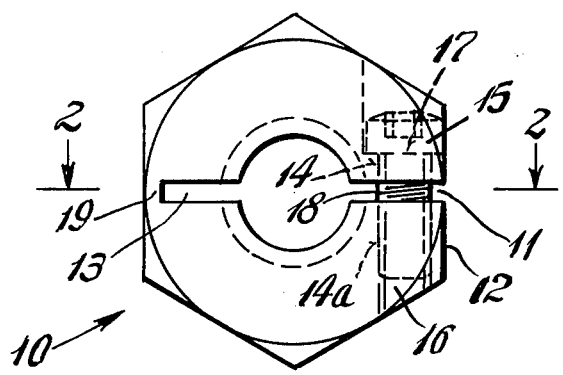
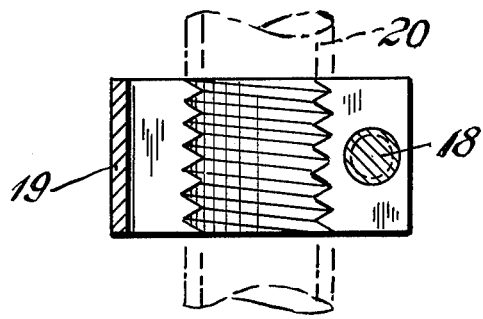
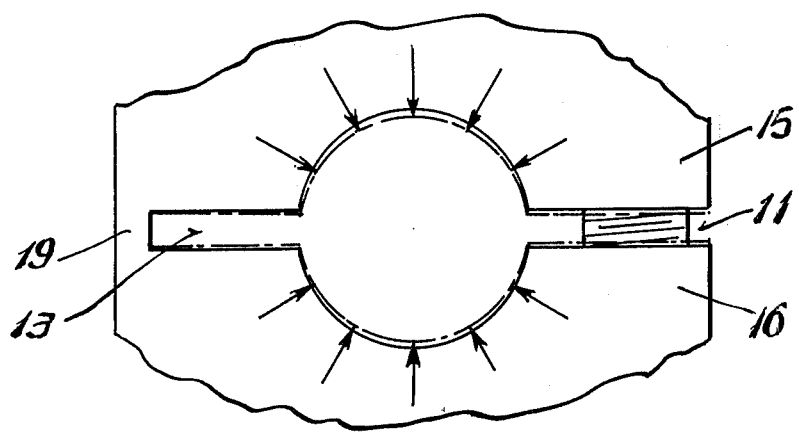

CLAMPING SPLIT LOCK NUT

The present invention relates to a type of nut that is internally threaded and capable of being easily positioned onto a shaft and then locked in place. The nut has a radial through slot whose width is adjustable to enable the internal diameter of the nut to be of generally normal size for threading or positioning onto the shaft and to be decreased in size to effect a clamping or locking of the nut to the shaft. One form of adjustability is provided by a manually operable screw that bridges the through slot.

While such split lock nuts have heretofore been suggested, as, for example in U.S. Pats. Nos. 896,465 and 1,097,218, the design of the nut has appeared to be a matter of random choice. It was recognized that a clamping force was provided by the internal diameter or bore of the nut being reduced by closing the through slot. The specific location in the nut where the reduction occurred, however, appeared to be either immaterial or haphazard or both, and, if uneven, was merely accepted. As the locking force of the nut depends as one factor on the area of contact between the nut and the shaft, failure to obtain as full and even contact as possible results in a decreased clamping force. Moreover, uneven reduction in a nut's internal diameter has tended to mar or damage the shaft which could subsequently hinder, if desired, the removal and replacement of the nut from the shaft.

It is accordingly an object of the present invention to provide a lock nut of the type having an adjustable through slot in which closure of the slot causes the nut to reduce its internal bore essentially evenly over its contact area with the periphery of the shaft whereby to maximize the nut's clamping ability.

Another object of the present invention is to achieve the above object with a lock nut that relates the ability of the portion of the nut opposite the slot to stretch or increase its peripheral size with the force that is being used to close the through slot.

A further object of the present invention is to provide a lock nut which, while achieving the above objects, is readily susceptible to economical manufacture, maintains its wrench receiving peripheral shape and is of extremely simple and durable construction.

In carrying out the present invention, a nut of conventional shape has a radial through slot formed from its periphery through to its interior bore. A screw hole, transverse to the nut's axis, is formed in the portions of the nut adjacent the slot, with the part of the hole in one portion being threaded and the part of the hole in the other portion being unthreaded. A ledge is formed adjacent the entrance to the hole so that a screw, when inserted into the hole and rotated, draws the two nut portions together to reduce the width of the slot.

A partial radial slot is formed in the nut diametrically opposite the radial slot and the extent of the partial slot is set by the cross-sectional area of the nut that is to remain. The present invention determines this area by use of a formula which finds that the area of the nut to remain is made approximately equal to 75% of the load to yield of the screw divided by the yield strength of the material forming the nut. The thickness of the nut preferably corresponds to conventional standards such as a heavy hex nut in accordance with ANSI BI8.2.2. Thus, by knowing the thickness of the nut and the remaining area together with the internal and external dimensions of the nut, the depth of the partial slot may accordingly be determined and formed, leaving the wanted cross-sectional area of the nut remaining.

With the nut constructed in accordance with the above, it has been found that as the screw is turned to close the through slot, the internal diameter of the nut decreases to place the remaining area under tension. This forces the partial slot to also tend to close at least adjacent the bore. Thus, the nut reduces its internal diameter as if two separate halves were being clamped together against the shaft. Such closing of both slots increases the size of the nut's surface that contacts the shaft and essentially evenly spreads the clamping force over this whole surface to thereby increase the clamping or locking force of the nut.

Other features and advantages will hereinafter appear.

Referring to the drawing:

FIG. 1 is a plan of a split lock nut constructed according to the present invention, shown twice full size.

FIG. 2 is a diametric section taken on the line 2—2 of FIG. 1.

FIG. 3 is a diagrammatic representation, somewhat exaggerated, showing the manner in which the closing of the through slot effects clamping of the nut against a shaft.

Referring to the drawing, the lock nut of the present invention is generally indicated by the reference numeral 10 and an embodiment thereof is shown to twice scale in FIG. 1. The nut has an internal threaded diameter of ½ inch, 13 UNC threads, a width across the hexagonal flats of 1 inch and a height of ½ inch. The nut may be and is preferably produced in accordance with common production tolerances, such as a class 3A or 2A external thread for ready threading onto a class 3B or 2B internal thread.

The nut then has formed therein a through slot 11 that extends radially from the middle of an outside flat 12 towards the axis of the nut. Along the same diametric line, a partial slot 13 is also formed in the nut so that both slots may be formed in one machining operation if desired.

For enabling closure of the through slot 11, a bore 14 is formed in one part 15 of the nut adjacent the slot while a continuation thereof, but threaded and indicated by the reference numeral 14a, is formed in the other adjacent part 16 of the nut. Further, a flat recessed surface 17 is formed adjacent the bore entrance so that a screw 18, when inserted into the bore 14, will have its head abut against the surface 17. Rotation of the screw 18 will cause the adjacent parts 15 and 16 of the nut to be moved together to effect closure of the slot. Reverse rotation, in the absence of permanent deformation of the nut, permits the slot 11 to spring back to its original size.

In accordance with the present invention, the depth of the partial slot 13 is determined by the amount of nut material that remains adjacent the slot and indicated by the reference numeral 19. It has been found that the cross-sectional area of this remaining portion should be related to the tensile strength of the material from which the nut is formed and also related to the force that the screw 18 is capable of applying to close the through slot 11, i.e., load to yield ability. The preferred relationship is to basically balance the screw closing force with the ability of the remaining portion 19 to resist stretch so that the area of the remaining portion is made to be capable of resisting a force in tension that is essentially equal to the screw's closing force. Accordingly, in an ideal situation if the slot 11 were closed sufficiently, the remaining portion would break at the same time the screw 18 gives.

The specific size of the area of the portion 19 may be easily and practically determined by dividing three quarters of the load to yield of the screw 18 in pounds by the yield strength of the nut material in pounds per square inch. The fraction "¾" is used as the accepted standard engineering practice for relating the actual maximum axial force a screw may exert when its yield strength is known.

As an example of the present invention, with the nut 10 being made of steel having a yield strength of 55,000 psi and with the screw 18 being No.8-32 screw having a load to yield strength of about 1960 pounds, the area of the remaining portion 19 is thus ¾ times 1960 divided by 55,000 or 0.0267 square inches.

The width of the remaining portion is determined by dividing this area by the nut height of ½ inch which produces a width approximately 0.0534 inches. The extent along the axis of the partial slot 13 is the width across the flats (1) less the internal diameter (½) divided by 2 or 0.250 inches less 0.053 or 0.197 inches. Thus, in this example, about ¾ of the radial thickness of the nut is removed to form the partial slot.

FIG. 3 shows a somewhat exaggerated representation of the structural changes in the nut when the screw 18 closes the through slot 11. As the slot 11 is decreased in width, its inner edges move together and also towards the axis of the nut. However, there is also exerted by reason of this slot width diminution, a tensil force on the area 19 which tends to stretch it and this permits the internal edge portion of the partial slot 13 to move together and also towards the nut axis. The upper half of the nut from the slots 11 and 13 moves downwardly while the lower half of the nut moves upwardly so that the nut tends to exert an even compressive force essentially completely about the periphery of shaft 20.

The increase in the area of clamping contact with the shaft and the evenness of the clamping force substantially maximizes the nut's clamping ability as compared to split lock nuts of heretofore known construction. The nut 10 has been found to be able to exert a clamping force having a resistance torque of 450 in-lbs.

As a comparison in clamping ability, a lock nut of 1½ inches diameter formed from material having a yield strength of 45,000 psi and with a ¼28 screw having a load to yield ability of 5100 lbs. had a calculated remaining cross-sectional area of 0.085 sq. inches. Even with this area being on the high side by 5%, it produced a resistance torque of 3000 inch pounds. An identical nut but with the partial slot extent reduced so that the cross-sectional area of the portion 19 was 36% greater than the calculated area produced a resistance torque of only 1875 inch pounds. In both instances the same turning force was applied to the screw 18 but the utilization of the present invention increased the clamping or locking torque substantially 60% higher than that obtained where the portion 19 had a cross-sectional area that was slightly more than one-third larger than the area calculated according to the present invention.

The width of the slots has not been found critical provided they enable sufficient reduction in the nut bore to effect clamping, while as an upper limit they should not exceed a width greater than ⅛ of the bore diameter. In the embodiment shown, the slot width of 1/16 inches has been found satisfactory.

The size of the screw is also not critical but should be of a size to provide the desired slot closing force and not, as an upper limit, remove too much nut material while also being capable of being recessed within the wrench receiving peripheral shape of the nut. In some instances, the screw will require that the nut be wider, i.e., have a greater distance across its flats, than standard nut dimensions. Moreover, a heavy nut having a somewhat thicker, i.e., length along its bore axis, may be used, if desired or required. In either event, the desired nut's cross-sectional area will remain the same.

The maximum extent of the partial slot should not exceed 95% of a through slot, leaving as a minimum of 5% width remaining portion.

Though a formula has been disclosed to determine the size of the area, the area may vary with ± 5% or so therefrom while still obtaining the advantages of the present invention.

While the nut has been shown hexagonal, it is anticipated that other wrench receiving peripheral shaped nuts may have the present invention incorporated therein. Further, the nut, while especially adapted for use with threaded shafts, may be used on plain shafts functioning like a locking collar, and may have an unthreaded bore if desired.

It will accordingly be understood that there has been disclosed a radially split clamping lock nut that is capable of providing a higher clamping force than heretofore suggested split nuts even though the nut would appear to be weaker by having less material. This is achieved by forming the nut to have a partial slot opposite the through slot so that the remaining portion of the nut thereat has a tensile strength that is approximately equal to the maximum force that is used to close the through slot. The nut will thus have its internal diameter essentially evenly reduced with a basically even compressive force throughout when clamped onto a shaft. The large contact area between the nut and shaft and the essentially evenly distributed compressive force maximizes the frictional engagement therebetween and hence the nut's clamping force and further minimizes the tendency of the nut to mar or otherwise damage the shaft when clamped thereon.

Variations and modifications may be made within the scope of the claims and portions of the improvements may be used without others.

I claim:

1. A clamping lock nut comprising a nut having an internal bore and an outer periphery, a through radial slot formed to extend from the periphery to the bore, a partial slot formed to extend essentially diametrically opposite the through slot with there being a remaining portion of the nut and means for exerting a closing force on the through slot; in which the cross-sectional area of the remaining portion of the nut is made to provide a tensile strength that is related to the closing force; in which the means for exerting a closing force includes a screw having an end portion threaded into a portion of the nut on one side of the through slot and a head abutting a ledge formed on another portion on the other side of the through slot; in which the maximum force is the actual load to yield force of the screw and in which the cross-sectional area of the remaining portion is substantially equal to three-fourths of the load to yield strength of the screw divided by the yield strength of the nut material.

2. The invention as defined in claim 1, in which the radial extent of the partial slot is equal to the radial width of the nut less the area of the remaining portion divided by the height of the nut, and in which the partial slot has an extent no longer than 95% of the radial width of the nut.

3. The invention is defined in claim 1 in which the nominal width of the slot is no wider than essentially 35% of the internal diameter of the bore of the nut.

4. The invention as defined in claim 1 in which the partial slot extends from the bore towards the outer periphery of the nut with the remaining portion being adjacent the outer periphery.

5. A clamping lock nut comprising a nut having an internal bore and an outer periphery, a through radial slot formed to extend from the periphery to the bore, means forming a partial radial slot extending essentially diametrically opposite the through slot and means for exerting a closing force on the through slot with said closing force having a nominal maximum value, and in which the means forming the partial radial slot includes setting the depth of the partial radial slot in accordance with the nominal maximum closing force to provide a remaining portion between the partial radial slot and the outer periphery of the nut that has a cross-sectional area having a tensile strength that is determined by the nominal maximum closing force value and in which the maximum tensile strength of the remaining portion approximately equals the nominal maximum force the closing means is capable of exerting to close the through slot.

* * * * *